US007529690B2

(12) United States Patent
Hadi (10) Patent No.: US 7,529,690 B2
(45) Date of Patent: May 5, 2009

(54) SYSTEM AND METHOD FOR DELIVERING REAL TIME REMOTE BUYING, SELLING, MEETING, AND INTERACTING IN A VIRTUAL REALITY ENVIRONMENT

(76) Inventor: Altaf Hadi, 123 Glen Ridge Dr., Murphy, TX (US) 75094

( * ) Notice: Subject to any disclaimer, the term of this patent is extended or adjusted under 35 U.S.C. 154(b) by 508 days.

(21) Appl. No.: 10/851,624

(22) Filed: May 22, 2004

(65) Prior Publication Data

US 2005/0261980 A1    Nov. 24, 2005

(51) Int. Cl.
*G06Q 30/00* (2006.01)
(52) U.S. Cl. .................................. 705/26; 705/1; 705/27
(58) Field of Classification Search .................... 705/26, 705/27, 1; 345/8
See application file for complete search history.

(56) References Cited

U.S. PATENT DOCUMENTS

| 6,570,563 B1* | 5/2003 | Honda ........................ 345/419 |
| 6,985,897 B1* | 1/2006 | Abrahams ...................... 707/4 |
| 7,054,831 B2* | 5/2006 | Koenig ........................ 705/14 |
| 7,062,454 B1* | 6/2006 | Giannini et al. ............... 705/27 |
| 2002/0026388 A1* | 2/2002 | Roebuck ....................... 705/27 |
| 2002/0113820 A1* | 8/2002 | Robinson et al. ............ 345/764 |
| 2002/0156703 A1* | 10/2002 | Abekawa ...................... 705/27 |
| 2002/0171604 A1* | 11/2002 | Tadysak ........................ 345/8 |
| 2003/0037101 A1* | 2/2003 | Torabi ........................ 709/203 |
| 2003/0083957 A1* | 5/2003 | Olefson ........................ 705/27 |
| 2003/0120823 A1* | 6/2003 | Kim et al. .................... 709/310 |
| 2004/0103038 A1* | 5/2004 | Power et al. .................. 705/26 |
| 2005/0021472 A1* | 1/2005 | Gettman et al. ............... 705/52 |
| 2005/0195367 A1* | 9/2005 | Selander et al. ............... 352/85 |
| 2005/0253840 A1* | 11/2005 | Kwon ......................... 345/419 |
| 2006/0143095 A1* | 6/2006 | Sandus et al. ................. 705/26 |
| 2007/0179867 A1* | 8/2007 | Glazer et al. .................. 705/27 |

OTHER PUBLICATIONS

Hairong Li, Terry Daugherty, and Frank Biocca. Characteristics of Virtual Experience in Electronic Commerce: A Protocol Analysis. Journal of Interactive Marketing, vol. 15, No. 3, Summer 2001.*

* cited by examiner

*Primary Examiner*—Jeffrey A. Smith
*Assistant Examiner*—Jason B. Dunham (57) ABSTRACT

A virtual reality interactional system and a method of use in which remote shoppers, remote advisors, remote sales consultants, remote product display agents, real time inventory status, live and stored audio and video content, and client server based virtual programming logic interact in real time to complete soft touch, high touch, and non-high touch products and services transactions. The virtual reality interacting system encompasses a combination of virtual reality hardware, virtual reality programming logic and communication networks. It can be used at homes, offices, virtual reality storefronts, or a combination thereof using high capacity private networks and also the Internet. Business to business, business to consumer, and consumer to consumer interactive interactions can be seamlessly performed by means of the current invention.

19 Claims, 4 Drawing Sheets

SYSTEM AND METHOD FOR DELIVERING REAL TIME REMOTE BUYING, SELLING, MEETING, AND INTERACTING IN A VIRTUAL REALITY ENVIRONMENT

TECHNICAL FIELD OF THE INVENTION

This invention relates generally to virtual reality business systems and more particularly to delivering real time remote buying, selling, meeting, and interacting in a virtual reality environment.

BACKGROUND OF THE INVENTION

Shoppers' today buy primarily in person at retail outlets. Electronic shopping over the Internet is also available to consumers in its basic and still primitive form. Shopping at retail outlets require consumers to pay a premium price to support the retail infrastructure. Retail also restricts consumer choice and reach. Internet shopping, though increasing on an yearly basis still accounts for a minute fraction of total retail sales. This is due to both real and perceived security concerns, and also because of the inability of the current Internet shopping paradigm to offer a rich buying experience. Amongst several more inhibitors to buy on the Internet, the aforementioned are the biggest roadblocks for the growth and evolution of electronic shopping. Even though increasing number of Internet storefronts are opening at regular intervals, an overwhelming majority of such electronic storefronts are yet to become profitable. Additionally, many Internet shopping storefronts are shutting down further lowering consumer confidence in electronic shopping. Because of these concerns, a major portion of the industrial world population segment may never make an electronic purchase using the Internet.

Profit spurs growth, and growth spurs innovation. With retail profits at their historical lows, and with rising operational costs, innovation has come to a standstill in this once profitable sector. Expansion into newer markets is happening at a cautious pace. Dot Com ventures of yester years tried to fill this gap, but failed miserably. Consumer expectations of an alternative buying paradigm which is enjoyable and reliable like traditional shopping, but which also offers substantial lower prices and global reach are yet to be met.

Most traditional and Internet retailers typically lack in one or more of the following areas:

1. They do not maintain and continue to evolve personal consumer profile which are essential for customer centric selling approach. Customer preferences such as price sensitivity, brand affinity, choices and dislikes are not employed and made use of during the sales process.
2. They do not monitor individual consumer consumption, nor predict their needs. The concept of market of one still remains an elusive idea. At best, consumer consumption is calculated and predicted on the basis of local store sales or local geography.
3. Most Internet shopping ventures leave shoppers at the mercy of their navigation skills. Shoppers are left to fend for themselves should they have any questions or concerns during the shopping session. This style of buying and selling does not accommodate for product and services, presentation and their demonstration.
4. Both the conventional retail shopping and today's electronic shopping does not provide a means for group based remote shopping, whereby two or more buyers can shop together as a group from different locations.

SUMMARY OF THE INVENTION

The present invention provides a system and method for delivering real time remote buying, selling, meeting, and interacting in a virtual reality environment, embodying a wide array of virtual reality hardware; virtual reality client server based programming logic; and high speed internetworking. In all its embodiments, the present invention is designed to be used at virtual reality storefronts, homes, and offices over high capacity private networks, and also over the Internet; thus replicating and enhancing real life buying, selling, meeting and interacting in a virtual environment.

In one embodiment of the present invention, participants using virtual reality interacting system of the example types of business to business; business to consumers; consumers to consumers etc. interact with each other through the use of virtual reality headgear. All sounds and facial gestures of the parties involved are communicated by means of the virtual reality headgear. Facial gestures can be of example types smiling, frowning, stating, blushing, dozing etc.

In another embodiment, participants using virtual reality interacting system can smell the smells of virtual reality landscapes, merchandise, etc. by means of the virtual reality smells generator.

In another embodiment, the virtual reality interacting system includes a virtual reality navigator, which comprises of virtual reality navigation mechanism, virtual reality seating mechanism, virtual reality aisle walkway, sensors, virtual reality touch pads, and communication interfaces.

In another embodiment, the virtual reality interacting system includes high resolution video and audio equipment.

In another embodiment, a virtual reality interacting system includes a centralized master controller unit having CPU and allied computing resources of prior known art, and also having the central server based progmrnming logic to control, coordinate, and monitor the seamless functioning of the many remote but similar virtual reality interacting systems.

Particular embodiments provide a means for navigation through the virtual reality paradigm. Sitting, standing, climbing, jogging, jumping, and walking through the virtual paradigm; merchandise demonstration; merchandise selection; services demonstration, services selection, etc are achieved by the combined use of the virtual reality headgear, virtual reality navigator, virtual reality aisle walker, and virtual reality sensors and touch pads Particular embodiments provide a means for two or more buyers located at the same location, or at different locations to shop together as a group. A buyer can be shopping at any of the virtual reality storefronts, and subsequently his or her group member or members can join the shopping session from home or office by means of the Internet. Likewise a buyer can be shopping from a home or office over the Internet, and his or her group member or members can join the shopping session from any virtual reality storefront. Buyers can also shop together from different virtual reality storefronts.

Particular embodiments provides means for remote shoppers, remote sales consultants, real time inventory status, live and stored audio and video content, and client server based virtual reality programming logic to interact in real time to complete soft touch, high touch, and non-high touch products and services transactions.

Particular embodiments provide means for capturing, coordinating, synchronizing, and displaying all gestures and actions of buyers and their remote sales consultants in the display unit of the virtual reality headgear creating an illusion of continuous reality.

Particular embodiments provide means for maintaining past transaction history of buyers while also keeping a running preference of their profiles and to associate such preferences during the sales process in real time.

BRIEF DESCRIPTION OF THE DRAWINGS

To provide a more complete understanding of the present invention and the features and advantages thereof, reference is made to the following description, taken in conjunction with the accompanying drawing, in which.

DESCRIPTION OF THE INVENTION

As used herein, the functional terminology of shoppers and buyers; sales consultants and merchandise demonstrators; virtual reality environment and virtual reality paradigm; transctions and interactions; and merchandise and equipment can be used interchangeably.

As described herewith, buyers are videotaped as they enter the virtual reality storefront. These images are then converted into digital images ready to interact in the virtual environment. With the exception of the face, the remainder of the buyer's torso along with all its adornments is represented virtually. This implies buyers are represented in the virtual environment with their real faces attached to their just videotaped body from shoulder down. Families and groups of shoppers are grouped together as a single shopping unit. Virtual reality interacting systems are strategically located all across the virtual reality storefront.

Buyers enter the virtual reality-shopping paradigm by wearing the virtual reality headgear. As they enter the virtual reality-shopping environment, their senses are transformed into a genie land with superb high quality real and imaginative landscapes, exotic smells and serene music imparting sensations and feelings to the buyer that they are amidst the virtual reality. The virtual reality interacting system combines the picture of all group members, and displays it in their headgear creating an illusion of entering together in the virtual reality paradigm. Family or group members can see each other in the virtual reality headgear and can talk amongst themselves. They can also see, hear, and interact with other shoppers shopping in the same virtual environments as they are. The group leader will have navigation control, while the rest of the group members can also share the navigation control.

Buyers who choose to shop from their home or office location using the Internet may have to upload their full size photograph during the initial registration process. If they have shopped before at a virtual reality storefront, they also have an option to use their existing videographed images. Remote buyers also have to identify if there are any other shoppers along with them. Two or more buyers can shop as a group from remote locations. A buyer can be shopping at any of the virtual reality storefront, and their group members can join them over the Internet. Likewise a buyer having initiated the virtual reality shopping session over the Internet from home or office; her group member or members can join her from any of the virtual reality storefronts. Internet buyers are assumed to posses all or a subset of the virtual reality shopping equipment available at the virtual reality storefront. The virtual reality interacting system binds together local and remote shoppers in a single shopping unit and session and they interact with each other as if they are present at the same virtual reality storefront. This mimics real life interaction.

Sales consultants working from remote virtual reality office centers are assigned to specific customer units as they sign on to the virtual reality system. Merchandise display areas may have dedicated merchandise demonstrators. A sales consultant can also act as a merchandise demonstrator. The remote merchandise demonstrators are housed with the merchandise at remote physical locations. Strategically placed high resolution video cameras capture the sounds and actions of merchandise and merchandise demonstrators and subsequently the virtual reality interacting system superimposes in real time these high quality audio and video clips in the virtual reality paradigm for the shoppers to see and interact with. Shoppers can also interact with virtual merchandise in the virtual reality environment.

The virtual reality system will be capable of blocking all buyer conversations until after their introduction with the sales consultant, and the merchandise demonstrator. This closely replicates the real world shopping experience while also preserving buyers' privacy. Furthermore, during interaction with the sales consultant or the merchandise display representative, buyers will have the ability to confer in private. As in real world retail shopping environment, shoppers can overhear other shopper's if they are in close proximity to them in the virtual environment. If the buyer is a repeat customer, the virtual reality system will attempt to assign the same sales consultant the shoppers have interacted previously. Based on their skills and ability in dealing with virtual customers, a sales consultant can be assigned to serve one or more customer units. Shoppers can also choose to shop and checkout merchandise and services without the aid of sales consultants or the merchandise demonstrators.

In the virtual environment, real and virtual merchandise can be displayed in well laid out real and virtual aisles. As buyers' enter the virtual shopping paradigm, professional greeter's or the virtual reality interacting system assigned sales consultant greets shoppers at the entry way of the virtual shopping paradigm, and the shopping session begins. The shopper and sales consultant interaction flows in a natural way as if they are present physically at the same location. The sales consultant interacts with the buyers using the similar virtual reality interacting system the shoppers are using. The virtual reality interacting system provides a means for multiple sales consultants to interact with a shopper and his or her group members, if any.

Buyer profile and their past transaction history will be available to the sales consultant during the virtual shopping session. Upon determining what the shoppers are looking for, the virtual reality interacting system can assist the sales consultant to lead the buyers to the appropriate merchandise display area. Shoppers can themselves approach any merchandise display area that they may be interested in. The merchandise demonstrator demonstrates the merchandise and answers any questions that the buyers may have. The virtual reality system also provides the flexibility for the shoppers to roam around by themselves in the virtual aisles, and call the sales consultant when they are ready to make a purchase. As shoppers walk around the virtual aisles, they will have the ability to view and inspect any merchandise they like without any aid from the sales consultant and or the merchandise demonstrators By means sensors and virtual touch pads, shoppers can interact with the merchandise. For example, changing channels on a TV set that they may want to purchase. In this example case, the virtual touch pad can link buyer commands to the actual or virtual TV located in its actual existence or virtual existence in the remote merchandise display center.

During the virtual shopping session, the virtual reality system will provide the ability for the sales consultant to update shopper profile in real time based upon any new information the shoppers may provide. Once buyers make a decision to purchase an item, the sales consultant can lead shoppers to his or her virtual office. The sales consultant then sits down with the buyers in the virtual office and completes the transaction. On their end the buyers physically sit on their respective virtual reality seating mechanism while the virtual reality interacting system creates an illusion that the buyers are physically seated with the sales consultant at a remote location. During the sales or services transaction, the virtual reality interacting system can also suggest the sales consultant to recommend additional items the shoppers may likely purchase based upon their past transaction history, and future consumption trends.

The virtual reality interactional system described heretofore, describes an example shopping session between remote participants using the virtual reality interactional system. Said system can be used for participants of example type business to business users, business to consumers, and consumers to consumers from a variety of remote locations.

DETAILED DESCRIPTION OF THE INVENTION

The detailed description of the present invention is described herewith in terms of real time remote shopping by means of example embodiments. Said invention can be used by participants of example type business to business users, business to consumers, and consumers to consumers from a variety of remote locations.

Figure 1:
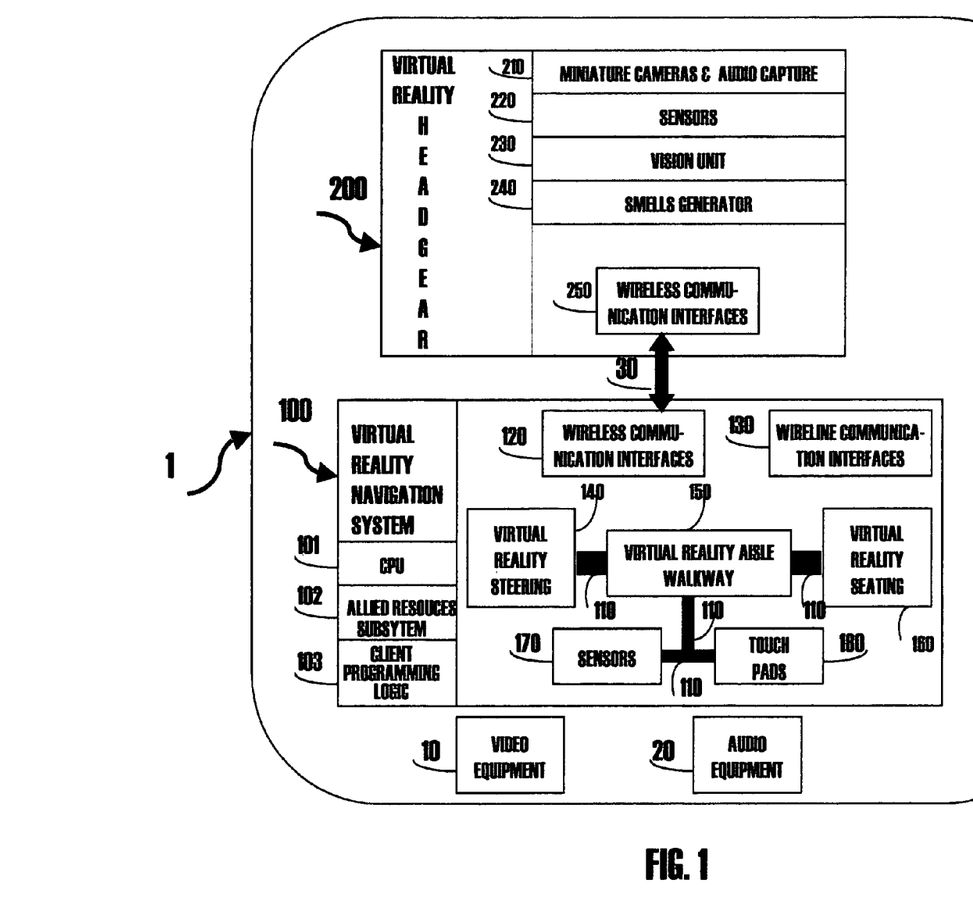
FIG. 1 illustrates an example virtual reality interacting system.

FIG. 1 illustrates an example virtual reality interacting system used for real time remote buying, selling, meeting and interacting in a virtual paradigm in real time. The key elements of virtual reality interacting system 1 are the virtual reality navigation unit 100, and the virtual reality headgear 200. Other component of the virtual reality interactive system 1 comprises of video equipment 10 and audio equipment 20.

Said virtual reality navigation system 100 comprises of a CPU 101; an allied resources subsystem 102 of prior known art comprising of storage, memory etc; client side programming logic 103; wireless communication interfaces 120, said interfaces comprising of wireless links and wireless network connections; and wireline communication interfaces 130, said interfaces comprising of wireline links and wireline network connections. The virtual reality navigation system also comprises of a tightly coupled 110 assembly of virtual reality steering 140; virtual reality aisle walkway 150; virtual reality seating 160; virtual reality sensors 170; and virtual reality touch pads 180.

Said virtual reality headgear 200 comprises of miniature cameras and audio system 210; sensors 220; vision unit 230; smells generator 240; and wireless communication links 250. Said virtual reality headgear communicates with the virtual reality navigation system by wireless means 30.

The virtual reality interacting system 1 by means of the virtual reality navigation system 100 captures, coordinates, synchronizes, and presents cohesive and rich three dimension visual views with full two way sound capabilities in the virtual reality headgear 200, creating a continuous illusion of reality to perform interactive activities of the example type of real time remote buying and selling. Miniature cameras and audio system 210 embedded in the virtual reality headgear 200 captures all facial gestures and sounds of the shoppers. Said cameras and audio system can also capture external surrounding video and audio. Field of vision on the vision unit 230 represents the actual field of vision with full panoramic views as possible in real life vision. Sensors 240 mounted on the virtual reality headgear 200 capture shopper head movements as they move their faces from side to side. Information 30 is exchanged between the virtual reality navigation system 100 and the virtual reality headgear 200 by means of wireless interfaces 120, and 250 respectively.

Shopper communicates with each other, and with sales consultants using virtual reality interactive system 1. The central controller unit 400 of FIG. 3 controls, coordinates, and presents the remote shoppers and their sales consultants' visual communication to each other on the vision unit 230 in the virtual reality headgear 200.

Figure 2:
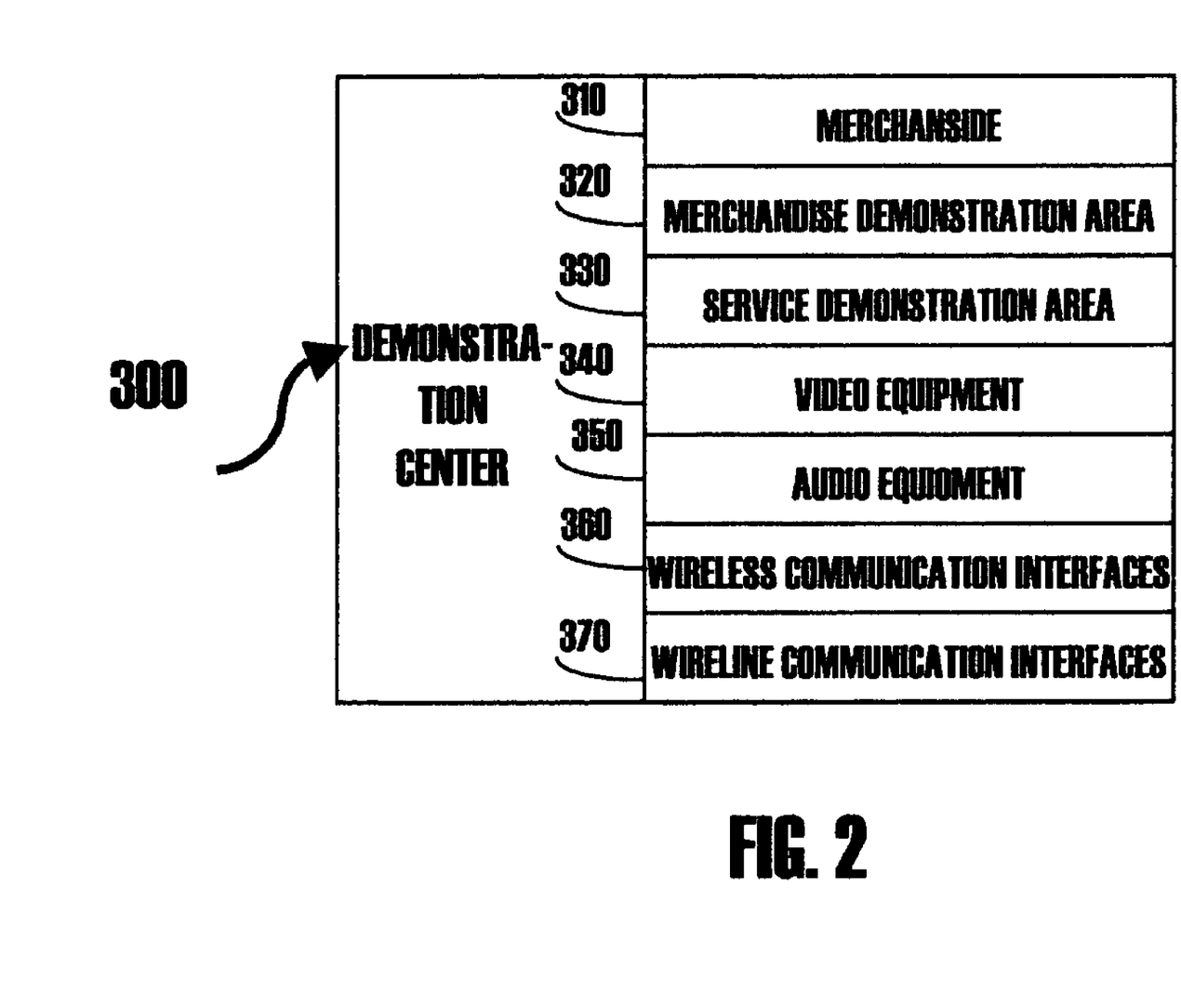
FIG. 2 illustrates an example demonstration center.

FIG. 2 is an example illustration of demonstration center 300 comprising of merchandise 310; merchandise demonstration area 320; service demonstration area 330; video equipment 340; audio equipment 350; wireless communication interfaces 360, said interfaces comprising of wireless links and wireless network connections; and wireline communication interfaces 370, said interfaces comprising of wireline links and wireline network connections. During the example remote shopping session; products and services are demonstrated to remote shoppers in real time from the demonstration center 300, and the audio and video of such demonstrations is superimposed in the virtual reality views of the vision unit 230 of the virtual reality headgear 200 by means of the central controller unit 400 of FIG. 3.

The virtual reality system 1 also provides the flexibility for the shoppers to roam around by themselves in the virtual aisles, and call the sales consultant when they are ready to make a purchase. As shoppers walk around the virtual aisles, they will have the ability to view and inspect any merchandise 310 without any aid from the sales consultant and or the merchandise demonstrators in the demonstration center 300.

Figure 3:
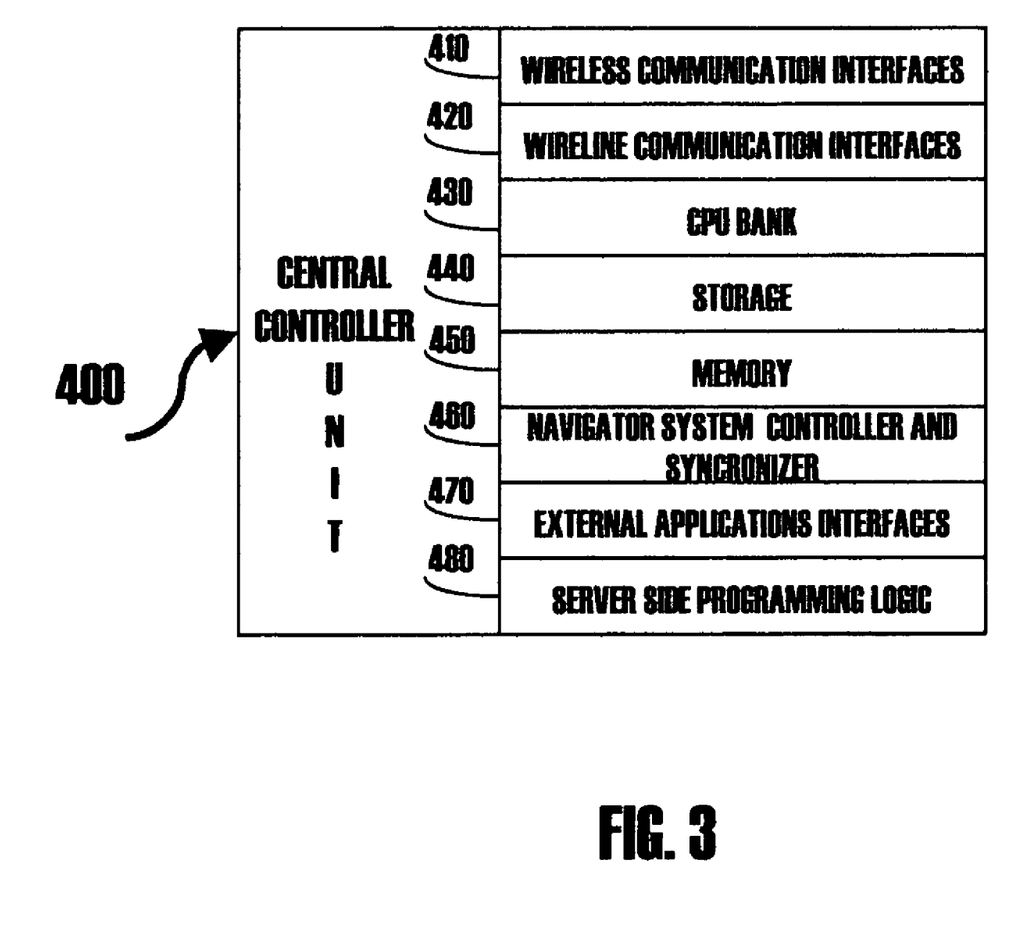
FIG. 3 illustrates an example central controller unit.

FIG. 3 is an example illustration of the central controller unit 400, which controls and coordinates the virtual reality interactive activities of example type shopping between remote shoppers, sales consultants and product demonstrators. Said shopping participants can be remotely present across a country, or across the world. The central controller unit 400 is the heart of the virtual reality interactive shopping and comprises of the key server programming logic 480. Said logic can be centralized in a given geography or can be distributed across several central controller units 400. The central controller unit 400 also comprises of wireless communication interfaces 410, said interfaces comprising of wireless links and wireless network connections; wireline communication interfaces 420, said interfaces comprising of wireline links and wireline network connections; CPU bank 430; allied subsystem resources of the type storage 440 and memory 450; virtual reality navigator system controller and synchronizer 460; and external applications interface 470. Said external applications interface 470 comprising of standard APIs of the applications types of inventory management; customer relationship management; billing and invoice management, security management, order management; warehouse and shipping management; and customer assurance management etc. The navigator system controller and synchronizer 470 provides means for seamless orchestration of the virtual reality interactive sessions between all the participants of a virtual reality shopping session.

Figure 4:
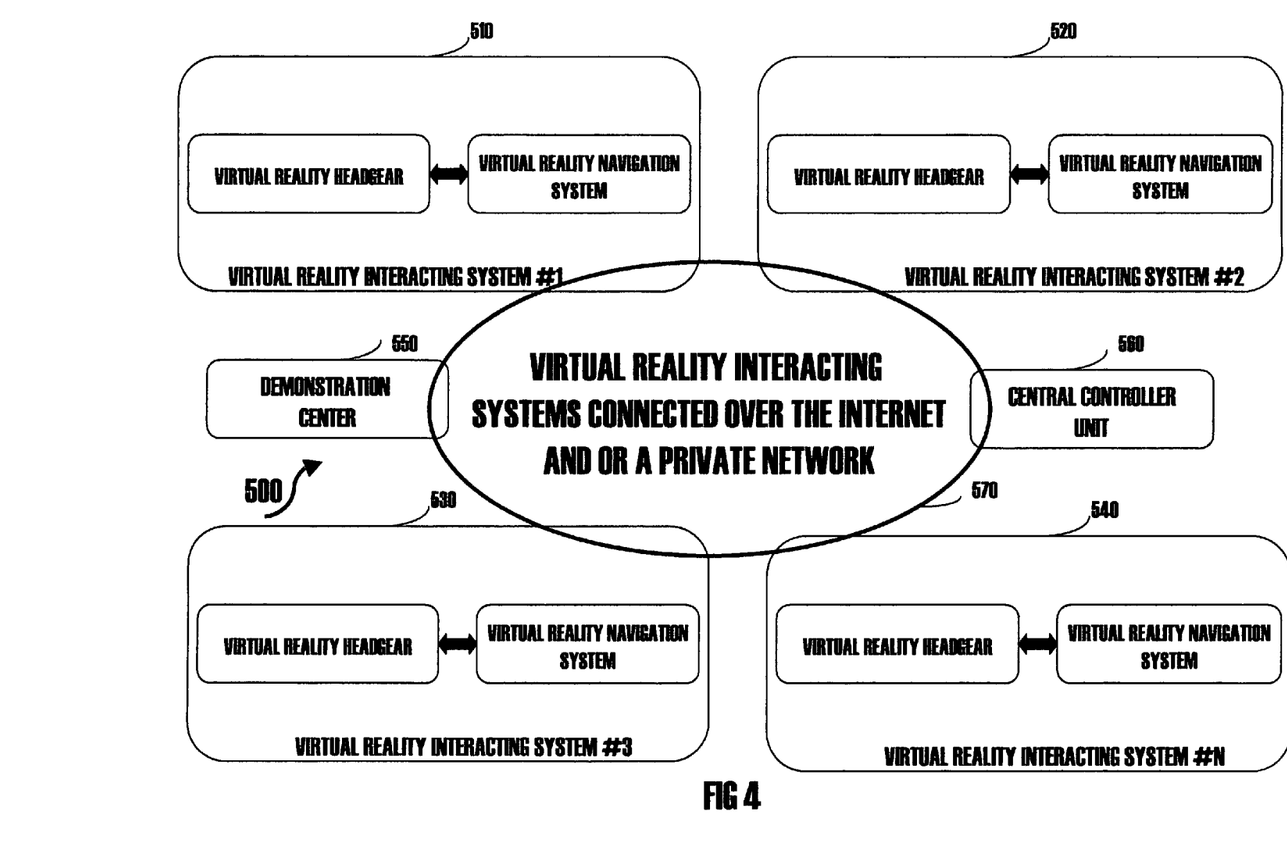
FIG. 4 illustrates an example of real time virtual reality interactive shopping from a plurality of remote locations connected by means of a private network and, or the Internet.

FIG. 4 is an example illustration of a plurality of virtual reality interacting systems 500 functioning over a high speed private network or the Internet 570. In a virtual reality interacting system 500 there can be two or more virtual reality interacting systems 1 of FIG. 1; one or more demonstration center 300 of FIG. 2; and one or more central controller 400 unit of FIG. 3. The example plural virtual reality interacting system 500 comprises of N virtual reality interacting systems 510, 520, 530, and 540 respectively; one or more demonstration centers 550 one or more central controller units 560; connected over a high speed private network or the Internet 570. Said network can cover a defined geography and can also encompass the entire geography of planet earth. The virtual reality interacting systems 510, 520, 530, and 540 can all be at one physical location or can be spread across several remote locations. Said locations can be of exclusive type of home locations, office locations, virtual reality storefront locations, or a combination thereof.

The present virtual reality invention along with all of its embodiments provides a means for delivering real time remote buying, selling, meeting and interacting in a virtual reality environment. One or more buyers when entering a virtual reality storefront or a virtual reality place of business are videotaped and audio taped using the strategically placed video equipment 10, and audio equipment 20 of FIG. 1. For purpose of illustration it is considered that a group of two shoppers enter a virtual reality storefront for the purpose of transacting business in a virtual environment with remote sales consultants and remote merchandise demonstrtors. Furthermore, the group of two shoppers will be joined by a third shopper who is remote to the group's present virtual reality storefront physical location. The third member of the group can join the shopping session from a location of example type of a home location, an office location, or another virtual reality storefront location. The third shopper's physical location can be connected to the original shoppers' location by means of private network or the Internet. For purposes of clarity, the third shopper is to join the group from another remote virtual reality storefront. The remote shopper can already be shopping in the virtual paradigm or can join the group of two shoppers at a later time. As mentioned heretofore, for purpose of clarity and also to illustrate the powerful nature of interaction in a virtual paradigm closely mimicking real life shopping, the third shopper is to join the group at a later time after the first two shoppers had commenced their virtual reality shopping session. As the example two shoppers enter a virtual reality storefront they are video graphed and audio graphed. The audio and the video graphs can also alert their remote sales consultant or consultants of their arrival, and can also act as bio-metric security signatures. Virtual reality interactive systems of FIG. 1 are strategically placed throughout the virtual reality storefront. A virtual reality storefront can be part of a traditional store or business or can be wholly of the type of a dedicated virtual reality storefront. A virtual reality storefront may have one or more virtual relating interacting systems of FIG. 1.

Access to the virtual reality interactive system is analogous to treadmill access of prior known art. The virtual reality aisle walker 150 of the virtual reality interactive systems is stationary. As the shoppers wear the virtual reality headgear 200, the vision unit 240 transforms the shoppers' senses into a serene virtual reality paradigm enabling the shoppers to sense and feel that they are physically present in the depicted virtual reality environment. Said headgear 200 being lightweight and comfortably ventilated. The virtual reality paradigm can be of an example type of sea side open air antique shopping, thereby the smells generator 240 fragrances the shopper senses with fresh breeze of salty sea air. Shoppers can choose to enter the virtual reality paradigm in a sitting posture by physically sitting on the virtual reality seating 160 mechanism of the virtual reality interacting system 1, or in a standing posture by standing on the aisle walker 150 of said virtual reality interacting system 1. Shoppers can also choose to wear the extremities sensors 170. The virtual reality steering mechanism 140 and the virtual reality touch pads 180 are at an arms length to the shoppers and can be auto adjusted based on their physique.

Buyers are videotaped as they enter the virtual reality interactive system 1. The video is converted into virtual images ready to interact in the virtual environment. With the exception of a shopper's head, face and neck, the rest of the buyer's torso along with all its adornments is represented virtually. This implies that buyers are represented in the virtual environment with their real faces attached to their just videotaped digital images. In the viral reality environment described heretofore, the two shoppers can see each other and interact with each other as when outside of the virtual reality headgear 200. At the entrance of the virtual reality paradigm, the shoppers are greeted with live or recorded professional greeter. The professional greeter can choose to shake hands with the shoppers, and the shoppers can respond to the greeter's handshake by means of the touch pads 180 which can take the shape of a human hand during handshake. The client programming logic 103 determines shopper moments by means of intelligent sensors 170 and touch pads 180. The client programming logic 103 further synchronizes shopper facial and body moments by means of information exchange between the virtual reality headgear 200 and the virtual reality navigation system 100 employing the wireless communications interfaces 250 and 120 of said components.

Shoppers can see each other by means of the vision unit 230 and can also see other shoppers like themselves in the virtual reality paradigm they are present. Communication between the shoppers is facilitated by means of the server programming logic 480 of central controller unit 400 of FIG. 3, which in turns receives inputs from all the participating client programming logic systems 103 of FIG. 1. Information exchange between the client programming logic 103 and server programming logic 480 can be facilitated by means of wireline and wireless communication interfaces 120 and 130 and 410 and 420 respectively. The navigator system controller and synchronizer 460 aids the server programming logic 480 in portraying seamless real life interactive behavior for the shoppers in the display vision units 230.

The recorded or live professional greeters can enquire what the shoppers are seeking to buy, and can direct them in the appropriate merchandise location. The vision unit 230 portrays identical virtual reality environment for the two shoppers. Furthermore, the same environment is portrayed in the vision units 230 of the other shoppers who tend to be present at that time in the same virtual reality environment. The example shoppers walk in the direction shown by the professional greeter. Shoppers can also choose to ignore the professional greeter's advice and begin to walk in whichever direction they choose to, as in real life. As they begin to walk, the stationary virtual reality aisle walker 150 comes alive enabling the shoppers to move in any direction of their choice, the directions being depicted in the vision unit 230 of the virtual reality headgear 200. The virtual reality aisle walker can be of example type of a belt and rotary ball bearings system. Movement sensors between the belt and the bearings capture the direction and speed of the walking shopper, and convey it to the client programming logic 103 of the virtual reality interacting system 1. At all times, shoppers will have a clear view of how and where they are walking in the vision unit 230; furthermore they will have complete control to manipulate their walking behavior as they would in real life walking scenarios.

As the two example shoppers begin to move towards the merchandise 310 of FIG. 2, they could see in their vision units 230, their remote friend walking towards them in the virtual paradigm. When said group's third shopper singed on to the virtual reality paradigm from a remote virtual reality storefront, the virtual reality interacting system 1 of FIG. 1 prompted the remote shopper that her company has begun the virtual reality shopping session and are waiting her arrival. The server programming logic 480 of the central controller unit 400 of FIG. 3 with the aid of navigator system controller and synchronizer 460 coordinates the meeting of the three shoppers in the virtual paradigm. The remote shopper by means of the virtual reality aisle walker 150 walks towards the two shoppers with their images and location portrayed in the newcomer's vision unit 230. Shoppers can exchange greeting handshake by means of the touch pads 180. The shopping group then moves towards the demonstration center 300 of FIG. 2 to inspect and purchase the merchandise 310. The server programming logic 480 of the central controller unit 400 superimposes the audio and video of the demonstration center 300 in the virtual paradigm facilitating for the remote shoppers to visit the demonstration center 300 remotely. Sales consultants by means of the virtual reality interacting system 1 can meet the shoppers in the virtual reality paradigm at the demonstration center 300 or at any time during the virtual reality shopping session. Shoppers can select the merchandise 310 from the demonstration center 300. The merchandise 310 can be of physical merchandise or virtual merchandise. The sensors 170 and touch pad 180 enables the shoppers to interact with the remote physical and or virtual merchandise 310 at the demonstration center 300. Sales consultants and or the shoppers can request the remote merchandise demonstrators at the demonstration center 300 to demonstrate merchandise 310 and or services. Demonstrators demonstrate merchandise 310 and services, if any, by means of the virtual reality interacting system 1 of FIG. 1 from the remote demonstration center 300. The video equipment 350 and audio equipment 360 captures the services and or the merchandise demonstration, and the demonstrated audio and video is furnished to the server programming logic 480 of FIG. 3 by means of communication interfaces 360 and 370 and 410 and 420 respectively. Said server programming logic 480 super imposes the merchandise and or service demonstration audio and video information in the vision unit 230 of the shoppers. Demonstrators can demonstrate the merchandise 310 or services in the merchandise demonstration area 320 and the service demonstration area 330. Upon merchandise 310 selections, the sales consultant can invite the buyers to a virtual office in the virtual reality paradigm to complete the transaction. By means of the virtual reality seating 160; sensors 170; and touch pads 180; the shoppers and the sales consultants complete the business transactions. The server programming logic 480 with the aid of external applications interface 470 facilitates the completion of transaction and the delivery of merchandise 310. The virtual reality steering 140 enables the shoppers to steer through the virtual aisles should the shoppers prefer to steer to the demonstration center instead of walking by means of the virtual reality aisle walkway 150. Sensors 220 of the virtual reality headgear 200 capture and convey the head movements of shoppers to the client programming logic 103. This information in turn is conveyed to the server programming logic 480 which by means of navigator system controller and synchronizer 460 facilities communication between the remotely located shoppers and their remote sales consultants and remote service and merchandise demonstrators.

While particular embodiments are described and illustrated, the particular embodiments described and illustrated are only representative of the subject matter contemplated. The scope of the present invention encompasses embodiments that are or could become apparent to those skilled in the art, and the scope of the present invention is to be limited only by the appended claims. In the claims, reference to an element in the singular is not intended to mean one and only one, but rather one or more unless explicitly stated. The present invention encompasses all structural and functional equivalents to the elements of the embodiments described and illustrated that are known or later come to be known to those of ordinary skill in the art. Moreover, it is not necessary for a device, method, or logic to address each and every problem sought to be solved by the present invention to be encompassed by the present claims. No element, component, or method step in the described and illustrated embodiments is intended to be dedicated to the public regardless of whether the element, component, or method step is explicitly recited in the claims. No claim element herein is to be construed under the provisions of 35 U.S.C. sections 112, sixth paragraph, unless the element is expressly recited using the phrase "means for."

What is claimed is:

1. A system for virtual shopping, comprising:
    a virtual reality navigation system; and
    a virtual reality headgear comprising sensor, vision unit, smell generator, camera, and audio communication systems communicably coupled to the virtual reality navigation system via a wireless connection;
    wherein the virtual reality headgear is worn by a user for entering a virtual reality environment;
    wherein a user, upon wearing the headgear, causes the sensor system to active a virtual reality environment to be displayed on the vision unit of the headgear, a smell to be emitted by the smell generator, and audio to be emitted by the audio system;
    wherein the virtual reality navigation system further comprises:
        a virtual reality walkway that permits the user to physically walk on the walkway and convey information about the walk in the virtual environment to the virtual reality headgear via the wireless connection;
        a virtual reality steering module that permits the user to physically navigate using the steering module and convey information about the navigation to virtual aisles in the virtual environment while on the virtual reality walkway, wherein the virtual reality steering module is communicably coupled to the virtual reality walkway, and
    a virtual reality seating mechanism that the user can physically sit on, that creates an illusion in the virtual environment that the user is physically seated with another individual at a remote location, wherein the virtual reality seating mechanism is communicably coupled to the virtual reality walkway;
    wherein the user can enter the virtual environment in a sitting posture by physically sitting on the virtual reality seating mechanism or in a standing posture by standing on the virtual reality walkway;
    the virtual reality navigation system further comprising sensors communicably coupled to the virtual reality walkway or virtual reality seating mechanism, wherein the sensors facilitate the user interacting with the merchandise appearing in the virtual environment; and the virtual reality navigation system further comprising touch pads communicably coupled to the sensors and to the virtual reality walkway or virtual reality seating mechanism, wherein the touch pads link the user to an item for interaction with the actual item at the remote location.

2. The system of claim 1, wherein the virtual reality steering module and the touch pads are at an arms length to the user and can be auto adjusted based on a physique of the user.

3. The system of claim 1, wherein the virtual reality headgear further comprises miniature cameras that capture facial gestures of the user and external surrounding video.

4. The system of claim 1, wherein the virtual reality headgear further comprises an audio system that captures sounds of the user and external surrounding sounds of other users.

5. The system of claim 1, wherein the virtual reality headgear further comprises a vision unit that provides the user with a field of vision with full panoramic views.

6. The system of claim 1, wherein the virtual reality headgear further comprises sensors that capture head movements of the user.

7. The system of claim 1, wherein information is exchanged between the virtual reality navigation system and the virtual reality headgear via a wireless interface in the virtual reality navigation system and a wireless interface in the virtual reality headgear.

8. The system of claim 1, wherein the virtual reality headgear further comprises a smell generator that provides the user with fragrances related to the virtual environment.

9. The system of claim 1, wherein the user can perform at least one of a following action via the virtual reality walkway: walk, run, jog, jump, climb and steer.

10. The system of claim 1, wherein the virtual aisles include merchandise that can be viewed, inspected, and purchased.

11. The system of claim 5 comprising a demonstration center able to demonstrate products and services to the user in real time, wherein audio and video of the demonstrations is provided to the user's vision unit.

12. The system of claim 11 comprising a central controller unit that coordinates, synchronizes, monitors and controls the virtual environment via one or more communication protocols over one or more communication networks, wherein the audio and video of the demonstrations is provided to the user's vision unit via the central controller unit.

13. A method for virtual shopping, comprising:
  entering a virtual environment by a user wearing a virtual reality headgear communicably coupled to a virtual reality navigation system via a wireless connection;
  walking on a walkway by a user and conveying information about the walk in the virtual environment to the virtual reality headgear via a wireless connection;
  steering, via a steering module physically coupled to the walkway, through virtual aisles in the virtual environment while walking on the walkway and conveying information about the steering to the virtual reality headgear via a wireless connection;
  wherein the virtual aisles display merchandise;
  interacting by the user with a virtual sales consultant when in the virtual environment by walking on the walkway or by sitting on a seating mechanism physically coupled to the walkway;
  interacting by the user with merchandise appearing in the virtual environment through the virtual reality navigation system via sensors communicably coupled to the virtual reality walkway or virtual reality seating mechanism;
  interacting by the user with the actual item at the remote location through the virtual reality navigation system via touch pads communicably coupled to the sensors and to die virtual reality walkway or virtual reality seating mechanism, wherein the touch pads link the user to said item; and
  receiving recommendations from the virtual sales consultant for one or more of the merchandise by the user using a profile and a past transaction history of the user.

14. The method of claim 13 comprising entering the virtual environment by a sales consultant wearing a virtual reality headgear while walking on a walkway, wherein the sales consultant and the user are in different locations.

15. The method of claim 13 comprising updating the profile of the user by the sales consultant in real time based upon any new information the user may provide.

16. The method of claim 13 comprising entering by the user into a virtual office of the sales consultant when the user wishes to purchase an item.

17. The method of claim 16 comprising completing the transaction by the sales consultant with the user in the virtual office.

18. The method of claim 13 comprising recommending additional items the user may likely purchase based upon die past transaction history and future consumption trends.

19. The method or claim 13 comprising multiple users at different locations each wearing a virtual reality headgear and entering a same virtual environment to shop together as a group.

* * * * *